Feb. 15, 1944.    H. HUSS    2,341,619
LATHE ATTACHMENT
Filed July 25, 1942    2 Sheets-Sheet 1

INVENTOR
Henry Huss
BY
James G. Bechtel
ATTORNEY

Feb. 15, 1944. H. HUSS 2,341,619
LATHE ATTACHMENT
Filed July 25, 1942 2 Sheets-Sheet 2
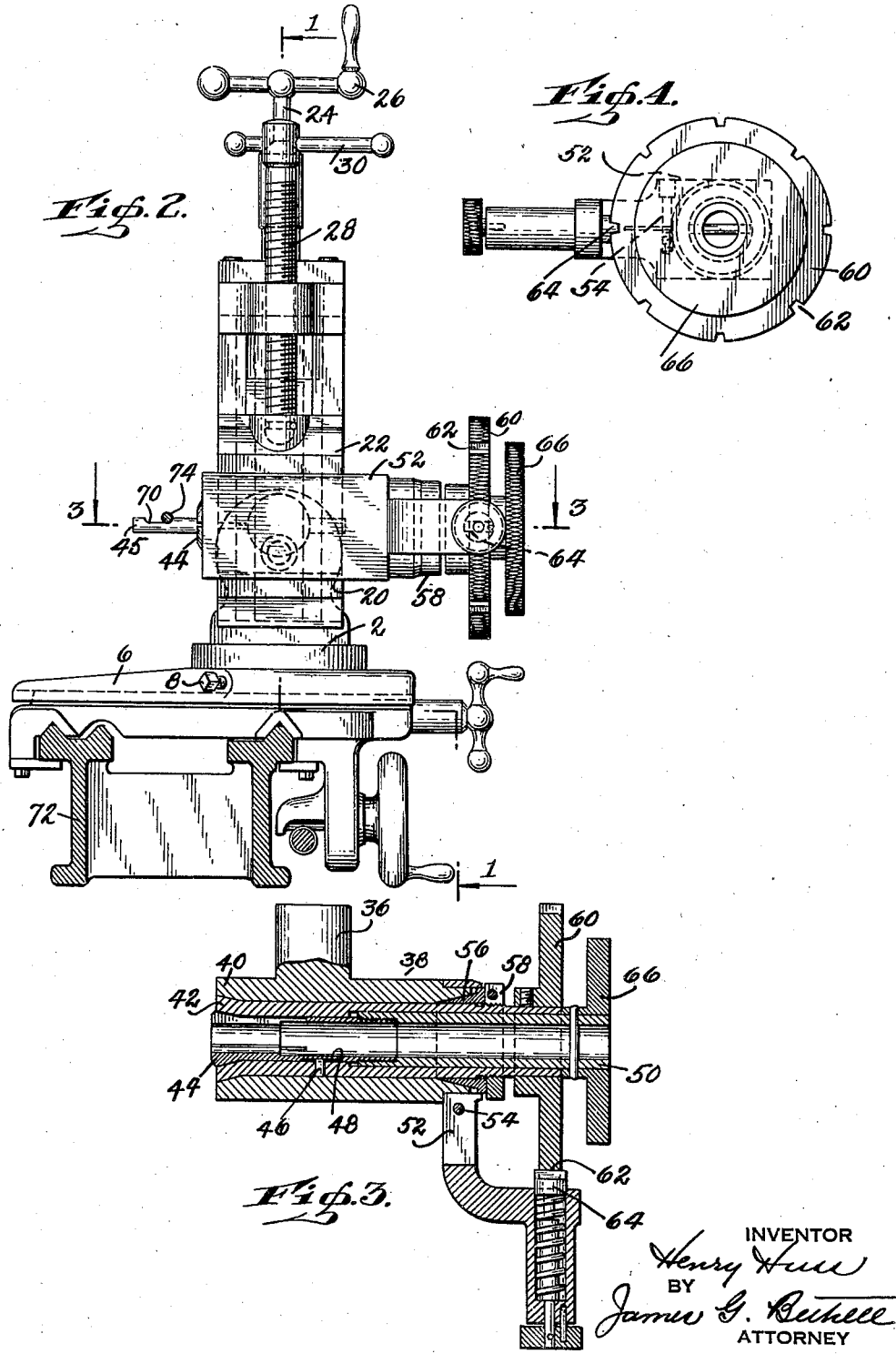

Patented Feb. 15, 1944

2,341,619

UNITED STATES PATENT OFFICE 2,341,619

LATHE ATTACHMENT

Henry Huss, Port Chester, N. Y., assignor to Auto-Ordnance Corporation, Bridgeport, Conn., a corporation of New York Application July 25, 1942, Serial No. 452,309

8 Claims. (Cl. 90—59)

My invention relates to the provision of an improved attachment for lathes, for quickly and economically adapting the lathe to operations which ordinarily would require the services of a milling machine.

More specifically my invention provides a milling fixture or attachment which is adapted to be mounted on the cross slide of an ordinary lathe, whereby many operations may be performed in the lathe for which ordinarily it would be necessary to employ not only a lathe but a milling machine as well. By way of example only and not in a limiting sense at all, I might mention that my fixture adapts a lathe for milling punches, end mills, keyways, etc.

It will be seen from the description to follow that my invention provides a fixture or attachment which is of great economic worth in that the cost of my attachment is almost negligible as compared with that of a milling machine, while in actual manufacturing operations a great deal of time is saved in eliminating the necessity of removing the work-piece from the lathe and conveying it to a milling machine where it has to be set up anew. In other words, under present practice the tool or other work-piece is first turned up in a lathe and is then removed and set up in a milling machine for whatever milling operations are to be performed. With my invention turning and milling operations are all performed in the one machine.

Many other advantages are inherent in the device of this invention which will appear as this description proceeds.

I have shown one embodiment of my invention in the accompanying drawings, in which:

Fig. 2 is an elevational view taken in the direction of the arrows 2—2 on Fig. 1;

Fig. 3 is a section on the line 3—3 of Fig. 2; and

Fig. 4 is an elevational view of the indexing plate.

Figure 1:
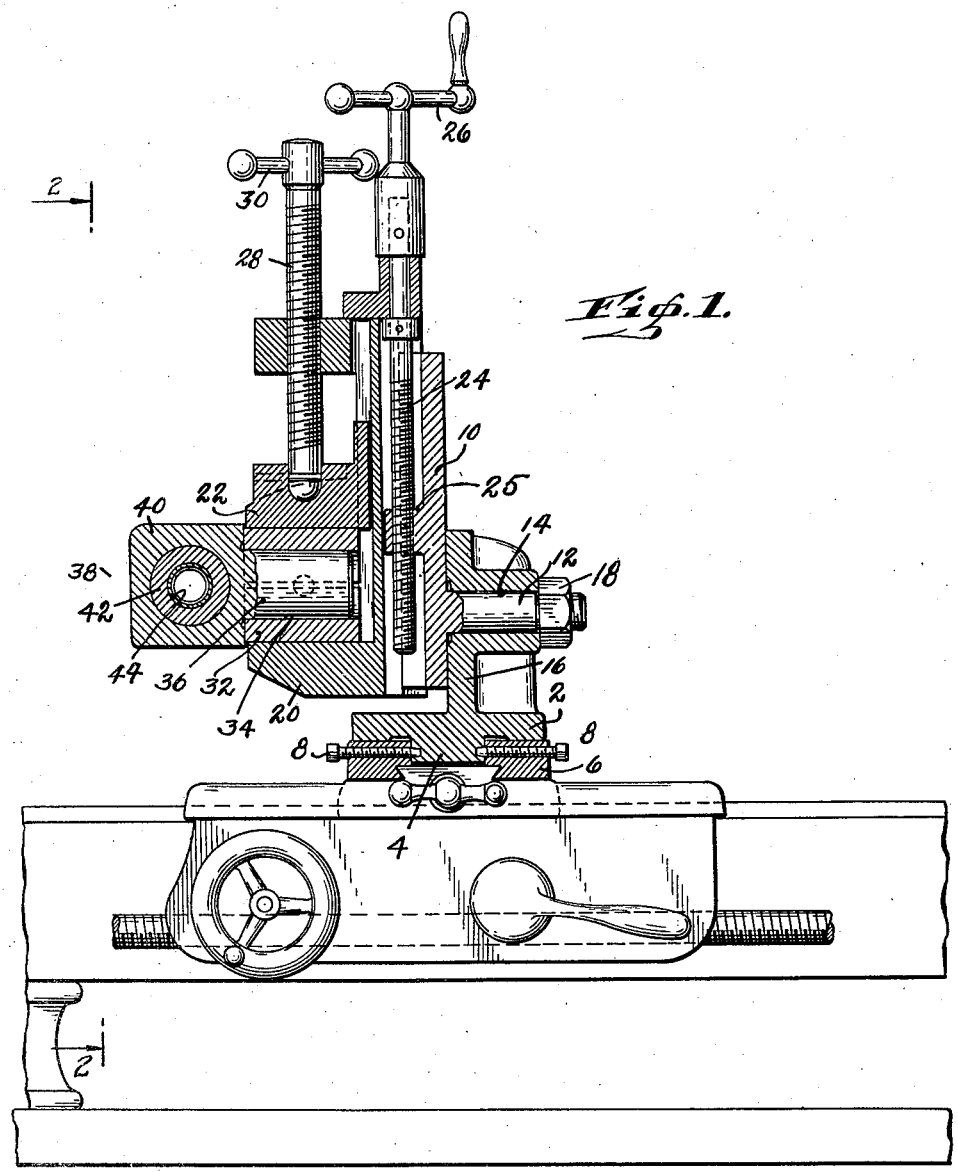
Fig. 1 is a sectional elevational view taken along the line 1—1 of Fig. 2.

Referring to the drawings in detail: 2 designates an angle bracket by which my attachment is mounted on a lathe. The base of this bracket is provided with a cylindrical boss or hub 4 adapted to be mounted in the cross slide 6 of an ordinary lathe, this boss being grooved circumferentially to accommodate the ends of clamping bolts 8 with which the lathe slide is provided. By loosening the bolts 8 the mounting bracket may be rotated about a vertical axis to any extent desired.

10 designates the body member of a vise constituting part of my improved milling fixture or attachment, this body member adjacent its lower end being provided with a cylindrical offset or boss 12 adapted to extend into a bore 14 provided for that purpose in the vertical portion 16 of the mounting bracket 2. This cylindrical projection or boss 12 provides a pivotal mounting for the fixture to permit the same to be rotated or tipped about a horizontal axis. Nut 18 received by the outer end of the boss 12 holds the fixture in adjusted position.

20 designates one vise jaw of the fixture, the other jaw being designated 22. Vertically extending rod 24 threaded through a lateral offset 25 on the body member 10 is adapted to be rotated by a handle 26 and is provided for adjusting the vise jaws 20 and 22 vertically as a unit; while threaded rod 28 rotatable by handle 30 is provided for adjusting the jaw 22 relatively to the jaw 20.

As so far described, therefore, the fixture can be moved crosswise and lengthwise of the lathe bed by the usual manipulation of the lathe slides; rotated about a vertical axis by reason of the rotatability of the mounting bracket 2; adjusted vertically with respect to the lathe bed by manipulation of the rod 24; and rotated or tipped about a horizontal axis by reason of the described mode of mounting in the bracket 16.

32 designates a block which is adapted to be clamped between the vise jaws 20 and 22, this block being provided with split bore 34 for receiving a cylindrical lateral projection 36 formed on the side of a chuck 38.

The chuck 38 is best illustrated in Fig. 3 from which it will be seen the same comprises a body member 40 with which the lateral cylindrical projection 36 above referred to is integral. The chuck body 40 is bored longitudinally, at right angles to the projection 36, to receive a shell 42 which extends the length of the body member and is rotatable therein, as will be explained later, and projects from the rear thereof. This shell 42 receives a spring collet 44 for a work-piece such as 45, for instance. The shell 42 is provided with a pin 46 which projects into the bore of the shell 42 to engage a flat 48 on the surface of the collet 44 so as to prevent the latter from rotating within the shell 42. Extending into the rear end of the shell 42 and threaded upon the rear end of the collet 44 is pullback tube 50 by which the collet is retracted in the shell 42 to clamp the work-piece.

Clamped to the rear end of the body member 40 and held against rotation thereon by clamping screw 54 is a split yoke 52 constituting part of the indexing mechanism of the fixture.

To prevent end motion of the shell 42 in the body member 40 in one direction, while permitting the shell to be rotated, I taper the shell at its outer end, while at the inner end of the body member the shell 42 is provided with a tapered split washer 56 and cooperating nut 58. The tapered split washer 56 and nut 58 also have the additional function of taking up any wear caused by intermittent rotation of the shell 42 in the body member 40.

Secured rigidly to the shell 42 is an indexing plate 60. This plate is notched at suitable intervals as shown at 62, these notches cooperating with plunger pawl 64 which is carried by the yoke 52.

On the extreme rear end of the pullback tube 50 and rigidly secured thereto is a handplate 66. The hub of this plate bears against the indexing plate, so that by rotating the handplate or pullback plate the pullback tube 50 which, as above pointed out, is threaded upon the collet 44 will cause the collet to be retracted to clamp the work-piece to be operated upon.

For purposes of clarity of illustration and description I have elected to show a very simple milling operation being performed upon the work-piece 45—simply the milling of a flat 70 on one side of this work-piece.

In performing this operation the attachment is adjusted, as shown in the drawings, so that the work-piece 45 which is clamped in the attachment by collet 44 extends horizontally crosswise of the lathe bed 72 and at right angles to the milling tool 74 which it will be understood is mounted in the headstock (not shown) of the lathe. If flats 70 are to be milled at different areas about the work-piece 45 it is then necessary, of course, to manipulate the indexing plate 60, as will be understood.

In the illustrated operation by reason of its lack of complexity the setting of the fixture is simple. The attachment as a whole extends perpendicular to the lathe bed and crosswise of it. However, far more complicated operations may be performed where desired; the adjustability as a unit of the fixture or attachment in the lathe slide 6, the adjustability of the fixture or attachment in the mounting bracket, the vertical adjustment of the vise and the adjustability of the chuck 38 in the block 32, permitting the work to be presented at any angle desired to a tool held in the headstock of the lathe.

It is to be understood that changes may be made in the details of construction and arrangement of parts herein illustrated and described without departing from the spirit and scope of my invention.

What I claim is:

1. A milling attachment for lathes, comprising in combination a mounting bracket for securing the attachment to the slide of a lathe, said bracket being rotatably adjustable about a vertical axis, a vise mounted on said bracket for rotative adjustment about a horizontal axis, and a chuck adapted to be clamped in said vise and rotatably adjustable about a horizontal axis.

2. A milling attachment for lathes, comprising in combination a mount for securing the attachment to a lathe slide, a vise carried by said mount, a block removably clamped in the jaws of said vise, and a chuck mounted in said block and rotatably adjustable therein about a horizontal axis.

3. A milling attachment for lathes, comprising in combination a vise adapted to be adjustably secured to a lathe slide, a block adapted to be clamped in the jaws of said vise, a chuck mounted in said block, and a collet received by the chuck, said chuck being rotatably adjustable in said block about an axis which extends at right angles to the longitudinal axis of the collet.

4. A milling attachment for lathes, comprising in combination a vise adapted to be adjustably secured to a lathe slide, a threaded rod for effecting vertical bodily adjustment of the vise relatively to the lathe, a clamping block for mounting in the vise jaws, and a chuck adapted to be clamped in a split bore in said clamping block, said chuck being rotatable about a horizontal axis in said clamping block.

5. A milling attachment for lathes, comprising in combination a vise adapted to be adjustably secured to a lathe slide, means for adjusting said vise bodily toward and away from the lathe slide, a spring block for mounting in the jaws of said vise, a chuck adapted to be clamped in a bore in said block for adjustment about an axis which is at right angles to the longitudinal axis of the vise.

6. A milling attachment for lathes, said attachment comprising a vise adapted to be attached to the slide of a lathe, a mounting for said vise adapting the same for adjustment about a horizontal axis, a clamping block received by the vise jaws, and a chuck received by a bore in said clamping block and adapting the chuck for adjustment about a horizontal axis independently of the said adjustment of the vise.

7. A milling attachment for lathes, said attachment comprising a mount adapted for attachment to a lathe slide and rotatably adjustable relatively thereto about a vertical axis, a vise mounted in said mount for adjustment in a vertical plane about a horizontal axis independently of the said mount adjustment, a clamping block adapted to be clamped in the jaws of said vise, a chuck adapted to be clamped by the vise jaws in a bore provided in said block, the chuck being rotatably adjustable about a horizontal axis independently of the said adjustments of the mount and vise.

8. A milling attachment for lathes, comprising in combination a mount adapted for attachment to a lathe slide and for adjustment relatively thereto about a vertical axis, a vise carried by said mount and adjustable relatively thereto about a horizontal axis, means for adjusting the vise toward and away from the lathe slide, a clamping block adapted to be clamped between the vise jaws, a chuck received thereby and adjustable about a horizontal axis, each of the said adjustments of the attachment being independent of all the others.

HENRY HUSS.